(12) United States Patent
Schulte (10) Patent No.: US 10,101,447 B2
(45) Date of Patent: Oct. 16, 2018

(54) SHARED AVIATION ANTENNA

(71) Applicant: Garmin International, Inc., Olathe, KS (US)

(72) Inventor: Christopher E. P. Schulte, Independence, OR (US)

(73) Assignee: Garmin International, Inc., Olathe, KS (US)

(*) Notice: Subject to any disclaimer, the term of this patent is extended or adjusted under 35 U.S.C. 154(b) by 473 days.

(21) Appl. No.: 14/723,140

(22) Filed: May 27, 2015

(65) Prior Publication Data

US 2016/0349361 A1 Dec. 1, 2016

(51) Int. Cl.
| | | |
|---|---|---|
| *G01S 13/74* | (2006.01) | |
| *G01S 19/42* | (2010.01) | |
| *H04B 1/59* | (2006.01) | |
| *H04B 7/26* | (2006.01) | |
| *G01S 13/79* | (2006.01) | |

(52) U.S. Cl.
CPC .............. *G01S 13/74* (2013.01); *G01S 13/79* (2013.01); *G01S 19/42* (2013.01); *H04B 1/59* (2013.01)

(58) Field of Classification Search
CPC ....... H04B 1/59; H04B 7/18506; G01S 13/74; G01S 13/781; G01S 13/9303; G01S 5/0072; G01S 13/765; G01S 13/782; G01S 13/784; G01S 13/09; G08G 5/0021; G08G 5/04; G08G 5/0013; G06K 7/0008
USPC ......................................................... 342/36
See application file for complete search history.

(56) References Cited

U.S. PATENT DOCUMENTS

| | | | | |
|---|---|---|---|---|
| 5,570,095 A | * | 10/1996 | Drouilhet, Jr. ........ | G01S 5/0072 342/357.31 |
| 8,102,301 B2 | | 1/2012 | Mosher | ........................... 342/36 |
| 8,344,935 B1 | * | 1/2013 | Hoffmann | ................ H01Q 1/28 342/30 |
| 9,274,521 B1 | * | 3/2016 | Stefani | ................. G08G 5/0026 |
| 2002/0021247 A1 | * | 2/2002 | Smith | ................... G01S 13/781 342/450 |

(Continued)

OTHER PUBLICATIONS

FAA TSO-C154c; Universal Access Transceiver (UAT) Automatic Dependent Surveillance-Broadcast (ADS-B) Equipment Operating on Frequency of 978 MHz; published Dec. 2, 2009.

(Continued)

*Primary Examiner* — Peter M Bythrow
*Assistant Examiner* — Nuzhat Pervin
(74) *Attorney, Agent, or Firm* — Samuel M. Korte; Max M. Ali (57) ABSTRACT

An Automatic Dependent Surveillance-Broadcast (ADS-B) avionics device for use in an aircraft with a transponder and an antenna comprises a first port, a second port, a transmitter, a switch, and a processing element. The first port may electrically couple to the transponder, and the second port may electrically couple to the antenna. The transmitter generates data to be transmitted over the antenna. The switch includes a first mode in which the transponder is electrically coupled to the antenna and a second mode in which the transmitter is electrically coupled to the antenna. The processing element is programmed to switch the switch from the first mode to the second mode, instruct the transmitter to transmit an ADS-B Out data packet to the second port, and switch the switch from the second mode to the first mode after the packet is transmitted.

26 Claims, 7 Drawing Sheets

(56) References Cited

U.S. PATENT DOCUMENTS

| | | | | |
|---|---|---|---|---|
| 2002/0075179 A1* | 6/2002 | Hudson | G01S 13/765 | 342/30 |
| 2002/0154061 A1* | 10/2002 | Frazier, Jr. | G01C 23/00 | 342/455 |
| 2003/0233192 A1* | 12/2003 | Bayh | G01S 13/765 | 701/301 |
| 2007/0200741 A1* | 8/2007 | Hunter | H04B 1/0007 | 341/126 |
| 2008/0174472 A1* | 7/2008 | Stone | G08G 5/0021 | 342/30 |
| 2009/0146875 A1* | 6/2009 | Hovey | G08G 5/04 | 342/357.31 |
| 2009/0322588 A1* | 12/2009 | Rolfe | G08G 5/0013 | 342/37 |
| 2010/0090882 A1* | 4/2010 | Donovan | G01S 13/781 | 342/32 |
| 2011/0148690 A1* | 6/2011 | Mosher | G01S 13/782 | 342/30 |
| 2012/0001788 A1* | 1/2012 | Carlson | G01S 13/784 | 342/30 |
| 2012/0038501 A1* | 2/2012 | Schulte | G01S 13/782 | 342/30 |
| 2012/0112950 A1* | 5/2012 | Hovey | G08G 5/04 | 342/29 |
| 2013/0121219 A1* | 5/2013 | Stayton | H04B 7/26 | 370/310 |
| 2013/0141268 A1* | 6/2013 | Getson | G01S 13/9303 | 342/30 |
| 2013/0307717 A1* | 11/2013 | Watson | G01S 13/9303 | 342/37 |
| 2014/0024391 A1* | 1/2014 | Assadi | G06K 7/0008 | 455/456.1 |
| 2014/0113554 A1* | 4/2014 | Wuidart | G06K 7/0008 | 455/41.1 |
| 2014/0197980 A1* | 7/2014 | Schulte | G01S 13/91 | 342/37 |
| 2016/0170025 A1* | 6/2016 | Johnson | G01S 19/14 | 342/357.4 |

OTHER PUBLICATIONS

RTCA DO282B, Section 2.2.14.3; 2009.
Printout from http://generalaviationnews.com/2015/04/09/sandia-aerospace-introduces-stx-360-sentinel/ published prior to May 27, 2015.

* cited by examiner

SHARED AVIATION ANTENNA

BACKGROUND

Automatic Dependent Surveillance-Broadcast (ADS-B) is part of a standard that defines a cooperative next generation air traffic system which will increase the situational awareness from aircraft to aircraft and aircraft to air traffic control. ADS-B establishes requirements for an aircraft to transmit data regarding its navigation. ADS-B avionics devices may be installed in aircraft that also include older generation air traffic system devices such as an onboard transponder which responds to ground-based secondary surveillance radar interrogations.

SUMMARY

Embodiments of the present technology provide an Automatic Dependent Surveillance-Broadcast (ADS-B) avionics device for use in an aircraft with a transponder and an antenna. An embodiment of the device broadly comprises a first port, a second port, a transmitter, a switch, and a processing element. The first port may electrically couple to the transponder, and the second port may electrically couple to the antenna. The transmitter may generate data to be transmitted on the antenna. The switch includes a first terminal electrically coupled to the first port, a second terminal electrically coupled to the first transmitter, and a third terminal electrically coupled to the second port. The switch may be selectively switched between a first mode in which the first terminal is electrically coupled to the third terminal and a second mode in which the second terminal is electrically coupled to the third terminal. The processing element may be in electronic communication with the first transmitter and a memory element. The processing element may be programmed to switch the switch from the first mode to the second mode at a first random time interval, instruct the first transmitter to transmit an ADS-B Out data packet to the second port, maintain the switch in the second mode for a first period of time during which the ADS-B Out data packet is transmitted, and switch the switch from the second mode to the first mode after the first period of time has elapsed.

Other embodiments of the technology provide a method of operating an Automatic Dependent Surveillance-Broadcast (ADS-B) avionics device to be implemented in an aircraft with a transponder and an antenna. The method broadly comprises the steps of: asserting an electronic signal at a first random time interval to be received by a switch that establishes an electrical connection between the antenna and an ADS-B transmitter; instructing the ADS-B transmitter to generate an ADS-B Out data packet; and deasserting the electronic signal after the ADS-B Out data packet is generated.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein.

The drawing figures do not limit the present technology to the specific embodiments disclosed and described herein. The drawings are not necessarily to scale, emphasis instead being placed upon clearly illustrating the principles of the technology.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
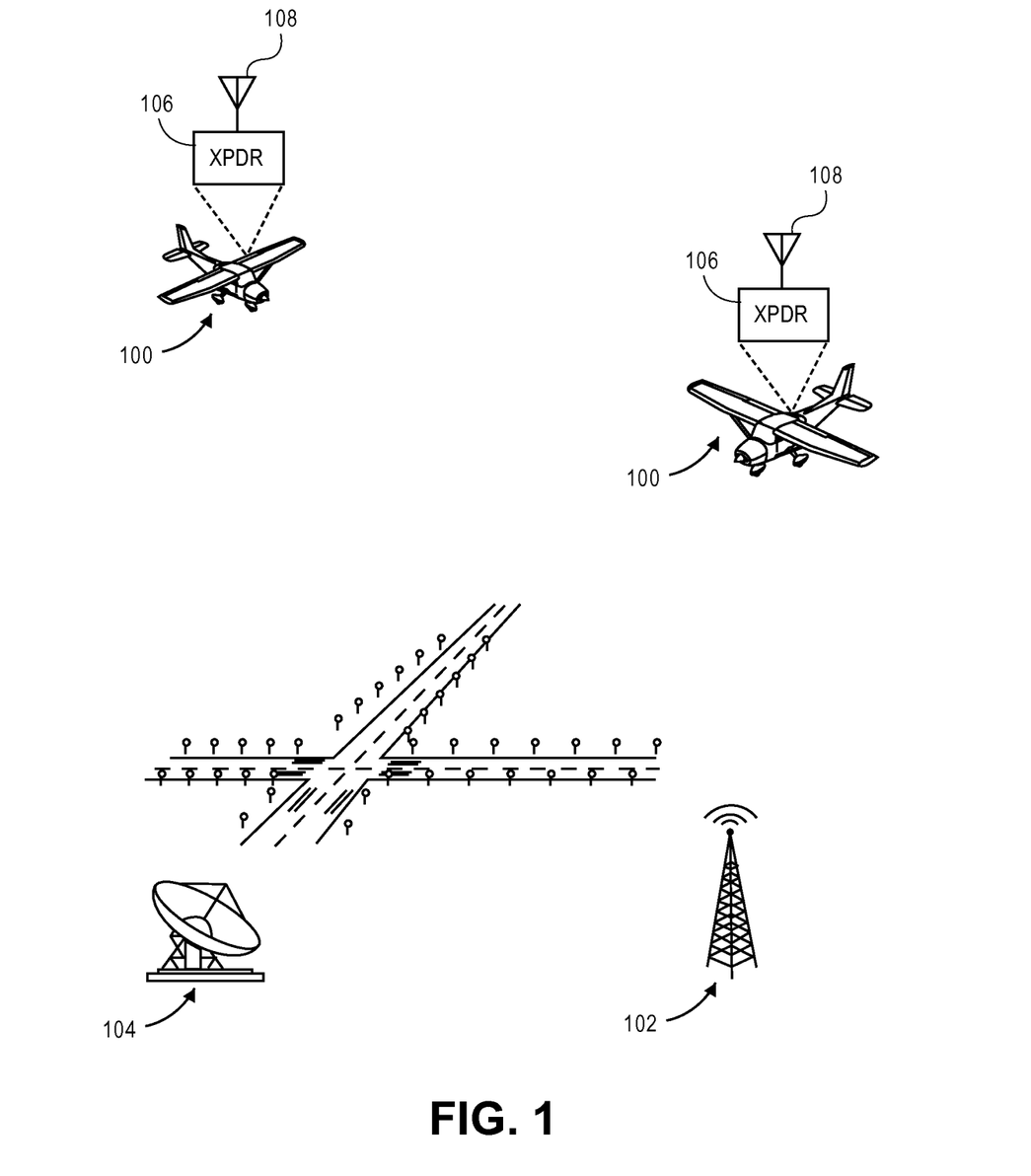
FIG. 1 is a schematic view of an environment in which the present technology may be utilized, the environment including a plurality of aircraft flying in the vicinity of an airfield with a secondary surveillance radar and a ground source radio tower, wherein each aircraft is equipped with a transponder and an accompanying antenna.

Embodiments of the present technology relate to avionics devices that are compliant with the Automatic Dependent Surveillance-Broadcast (ADS-B) standard. Embodiments of the present technology may be utilized in the exemplary environment shown in FIG. 1 in which a plurality of aircraft 100 fly in a controlled airspace. Part of the ADS-B specification includes ADS-B Out, which may require that an aircraft 100 be able to broadcast or transmit its navigational data to ground sources 102 and other aircraft 100 on a regular basis while in flight or on the ground. The navigational data may include the aircraft's position, altitude, velocity, and heading, whether the aircraft 100 is turning, descending, or climbing, and the like. The aircraft 100 may transmit an identification code or number along with the navigational data. The ground sources 102 may include aviation information broadcast stations as well as air traffic control towers.

ADS-B may also incorporate a universal access transceiver (UAT) that provides data communication at a frequency of 978 MHz for general aviation aircraft 100 that operate exclusively at an altitude below 18,000 feet. Thus, ADS-B Out UAT compliant avionics devices may include transmitter electronic circuits along with antenna elements that can operate at these frequencies. ADS-B avionics devices may also include or be able to access a location determining element, such as a global positioning system (GPS) device to provide geolocation and navigational data.

ADS-B avionics devices may be installed in aircraft 100 that already include an onboard transponder 106 (indicated as "XPDR" in FIG. 1) which is part of a still used air traffic monitoring system that utilizes radar including ground-based secondary surveillance radar (SSR) 104. The SSR 104 antenna rotates continuously through a 360-degree path. At regular intervals, the SSR 104 transmits (at 1030 MHz) an interrogation ping to all aircraft 100 within a certain range of the SSR 104, which is typically located at an airstrip, airport, or airbase. The transponder 106 may receive the interrogation and may respond by transmitting (at 1090 MHz) data that includes a digital "squawk" code (mode A) for the aircraft 100 and a current pressure altitude (mode C) of the aircraft 100. Thus, the transponder 106 may include transmitter and receiver electronic circuits that can transmit and receive data. The transponder 106 may also include a display, an altimeter to determine the pressure altitude, and a user interface to adjust the squawk code. In addition, the transponder 106 may include or be in electronic communication with an antenna 108 to transmit and receive radio waves that contain the transponder data. The antenna 108 may include one or more elements typically mounted on an exterior surface of the aircraft 100. Installing ADS-B avionics devices on an aircraft 100 that includes a transponder 106 may lead duplication of components, such as antenna 108 elements, which may adversely increase the cost of the ADS-B devices. In addition, an antenna accompanying the ADS-B avionics device would have to be installed on the exterior of the aircraft 100 increasing the cost of installation as well.

Figure 2:
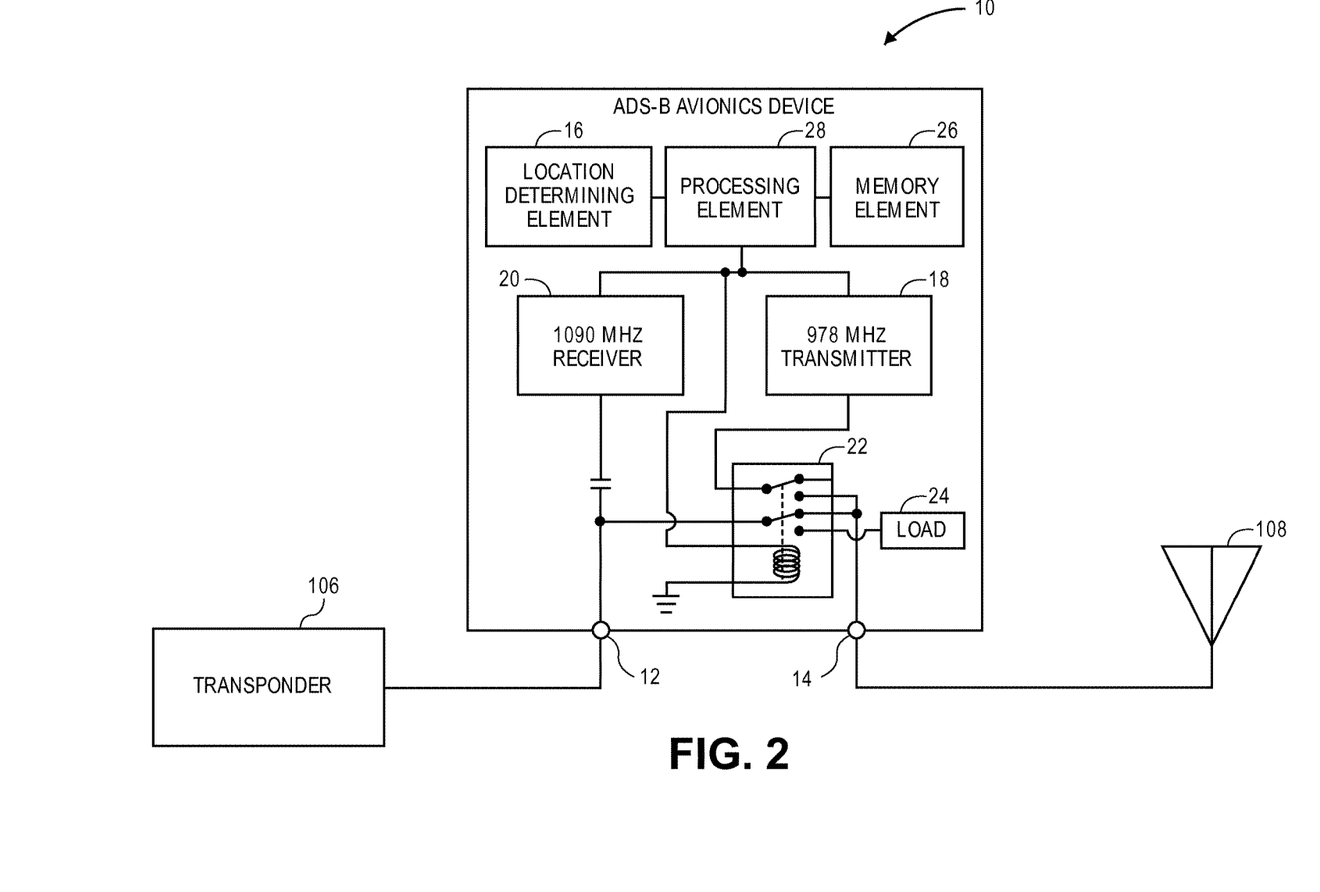
FIG. 2 is a schematic block diagram of an Automatic Dependent Surveillance-Broadcast (ADS-B) avionics device, constructed in accordance with an embodiment of the present technology, that is installed in an aircraft and interfaces with the transponder and the antenna.

Embodiments of the technology will now be described in more detail with reference to the drawing figures. Referring initially to FIG. 2, a first embodiment of an Automatic Dependent Surveillance-Broadcast (ADS-B) compliant avionics device 10 is illustrated. The ADS-B avionics device 10 is installed in an aircraft 100 that typically flies in controlled airspace. The aircraft 100 may further include a transponder 106 and an antenna 108. The ADS-B avionics device 10 may provide ADS-B Out universal access transceiver (UAT) communications, and it eliminates the above-mentioned drawback by being able to share the antenna 108 with the transponder 106 while maintaining minimum required performance standards, such as the minimum operational performance standards (MOPS) from the Federal Aviation Administration (FAA) or civilian aviation authority (CAA) from the European Aviation Safety Agency (EASA). The ADS-B avionics device 10 broadly comprises a first port 12, a second port 14, a location determining element 16, a transmitter 18, a receiver 20, a switch 22, a load 24, a memory element 26, and a processing element 28. The ADS-B avionics device 10 may further include a housing to house the aforementioned components, one or more printed circuit boards to electrically couple the aforementioned components, and a display or indicators, such as lights, to indicate a status of the ADS-B avionics device 10.

The first port 12 generally provides electrical connection to the transponder 106. The first port 12 may include a radio frequency (RF) type electrical connector such as a BNC, F, UHF, or the like type connector. The first port 12 is generally mounted on a wall of the housing for the ADS-B avionics device 10 so that a coax cable electrically coupled to the transponder 106 may be connected to the first port 12.

The second port 14 generally provides electrical connection to the antenna 108 and may include the same or similar type of electrical connector as the first port 12. The second port 14 is generally mounted on a wall of the housing for the ADS-B avionics device 10 so that a coax cable, separate from the transponder 106 coax cable, electrically coupled to the antenna 108 may be connected to the second port 14.

The location determining element 16 generally determines a current geolocation of the aircraft 100 and may receive and process radio frequency (RF) signals from a global navigation satellite system (GNSS) such as the global positioning system (GPS) primarily used in the United States, the GLONASS system primarily used in the Soviet Union, or the Galileo system primarily used in Europe. The location determining element 16 may accompany or include an antenna to assist in receiving the satellite signals. The antenna may be a patch antenna, a linear antenna, or any other type of antenna that can be used with location or navigation devices. The location determining element 16 may include satellite navigation receivers, processors, controllers, other computing devices, or combinations thereof, and memory. The location determining element 16 may process a signal, referred to herein as a "location signal", from one or more satellites that includes data from which geographic information such as the current geolocation is derived. The current geolocation may include coordinates, such as the latitude and longitude, of the current location of the aircraft 100. The location determining element 16 may communicate the current geolocation to the processing element 28, the memory element 26, or both.

Although embodiments of the location determining element 16 may include a satellite navigation receiver, it will be appreciated that other location-determining technology may be used. For example, cellular towers or any customized transmitting radio frequency towers can be used instead of satellites may be used to determine the location of the aircraft 100 by receiving data from at least three transmitting locations and then performing basic triangulation calculations to determine the relative position of the device with respect to the transmitting locations. With such a configuration, any standard geometric triangulation algorithm can be used to determine the location of the electronic device. The location determining element 16 may also include or be coupled with an accelerometer, compass, or other dead-reckoning components which allow it to determine the location of the device 10. The location determining element 16 may determine the current geographic location through a communications network, such as by using Assisted GPS (A-GPS), or from another electronic device. The location determining element 16 may even receive location data directly from a user.

In exemplary embodiments, the location determining element 16 may be implemented within a housing or enclosure that houses all of the other components of the ADS-B avionics device 10. In other embodiments, the location determining element 16 may be implemented in another avionics device or as a self-contained, standalone device which communicates geolocation information to the ADS-B avionics device 10.

The transmitter 18 generally transmits data to be received by other aircraft 100 and ground sources 102. The transmitter 18 may transmit the ADS-B Out data using UAT protocols. Alternatively, the transmitter 18 may be considered part of a UAT. Therefore, the transmitter 18 may include electronic circuitry that can transmit an electronic signal at 978 MHz. The electronic circuitry may include amplifiers, filters, encoders, mixers, oscillators, digital signal processors (DSPs), and the like. The transmitter 18 may include an input from the processing element 28 that receives ADS-B Out data to be communicated to the antenna 108 for transmission. In some embodiments, the transmitter 18 may also receive control signals from the processing element 28. The transmitter 18 may further include an output that transmits the ADS-B Out data at 978 MHz to the switch 22.

The receiver 20 generally receives transponder data through the first port 12. Therefore, the receiver 20 may include electronic circuitry that can receive an electronic signal at 1090 MHz. The electronic circuitry may include amplifiers, filters, decoders, mixers, oscillators, DSPs, and the like. The receiver 20 may include an input that is RF coupled to the first port 12 in order to receive data from the transponder 106. In some embodiments, the receiver 20 may receive control signals from the processing element 28. The receiver 20 may further include an output electrically coupled to the processing element 28 that communicates the transponder data thereto.

Figure 3:
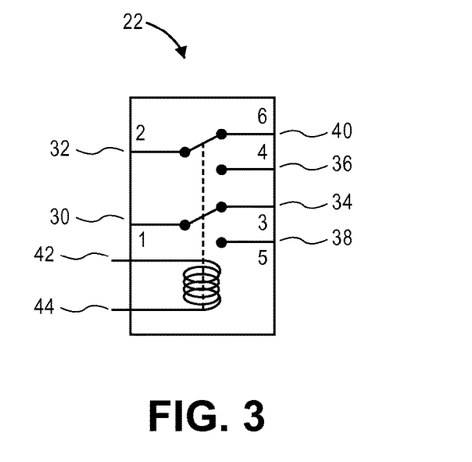
FIG. 3 is a schematic block diagram of a switch that is included as a component of the ADS-B avionics device.

The switch 22 generally switches the electrical connection to the second port 14 between the first port 12 and the output of the first transmitter 18. The switch 22 may be implemented as a double-pole, double-throw (DPDT) switch, wherein the processing element 28 controls the switching operation. The switch 22 may include solid state or electromechanical switches, which utilize components such as transistors, attenuators, pin diodes, and the like. An exemplary switch 22, as shown in FIGS. 2 and 3, may be embodied by a DPDT relay, wherein the processing element 28 energizes a coil, or actuator, of the relay. Thus, the switch 22 may include a first terminal 30, a second terminal 32, a third terminal 34, a fourth terminal 36, a fifth terminal 38, a sixth terminal 40, a first control terminal 42, and a second control terminal 44. The first terminal 30 is a common contact of a first pole which may be electrically coupled to the first port 12. The second terminal 32 is a common contact of a second pole which may be electrically coupled to the output of the transmitter 18. The third terminal 34 is a normally closed contact of the first pole. The fourth terminal 36 is a normally open contact of the second pole. The fourth terminal 36 may be electrically coupled (or shorted) to the third terminal 34, and both may be electrically coupled to the second port 14. The fifth terminal 38 is a normally open contact of the first pole which may be electrically coupled to the load 24. The sixth terminal 40 is a normally closed contact of the second pole which typically remains unconnected. The first control terminal 42 may be electrically coupled to the processing element 28, while the second control terminal 44 may be electrically coupled to electrical ground.

The switch 22 may operate in one of two modes. A first mode may be a default mode or a non-energized state. Accordingly, the first terminal 30 is electrically coupled to the third terminal 34 (which is electrically coupled to the fourth terminal 36), and the second terminal 32 is electrically coupled to the sixth terminal 40. A second mode may be an energized, activated, or actuated mode. Thus, the first terminal 30 is electrically coupled to the fifth terminal 38 (which is electrically coupled to the load 24), and the second terminal 32 is electrically coupled to the fourth terminal 36 (which is electrically coupled to the third terminal 34). The switch 22 may be switched from the first mode to the second mode by the processing element 28 generating, or asserting, a signal (which is typically a voltage or current). The switch 22 may be switch from the second mode to the first mode by the processing element 28 terminating, or deasserting, the signal. In turn, the common contacts of each pole switch back to the normally closed contact, which is their default position.

The load 24 generally provides termination for the transponder 106 when the transponder 106 is not electrically coupled to the antenna 108. Thus, the load 24 may include an impedance, such as 50 ohms, electrically coupled to electrical ground.

The memory element 26 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 26 may be embedded in, or packaged in the same package as, the processing element 28. The memory element 26 may include, or may constitute, a "computer-readable medium". The memory element 26 may store the instructions, code, code segments, software, firmware, programs, applications, apps, services, daemons, or the like that are executed by the processing element 28. The memory element 26 may also store settings, data, documents, sound files, photographs, movies, images, databases, and the like.

The processing element 28 may include processors, microprocessors, microcontrollers, digital signal processors (DSPs), field-programmable gate arrays (FPGAs), analog and/or digital application-specific integrated circuits (ASICs), or the like, or combinations thereof. The processing element 28 may generally execute, process, or run instructions, code, code segments, software, firmware, programs, applications, apps, processes, services, daemons, or the like. The processing element 28 may also include hardware components such as finite-state machines, sequential and combinational logic, and other electronic circuits that can perform the functions necessary for the operation of the current invention. The processing element 28 may be in communication with the other electronic components through serial or parallel links that include address busses, data busses, control lines, and the like.

The processing element 28 may be operable, configured, or programmed to receive data periodically from the location determining element 16 regarding the geolocation of the aircraft 100. In some embodiments, the location determining element 16 may also provide navigational data for the aircraft 100, such as velocity data, acceleration data, rate of climb or descent data, heading data, and the like. In other embodiments, the processing element 28 may be able to determine, calculate, or compute the navigational data given periodically updated geolocation data.

The processing element 28 may also be operable, configured, or programmed to receive data periodically from the receiver 20. The data may include Modes A and C transponder data, which includes the squawk code and the pressure altitude of the aircraft 100.

Figure 4:
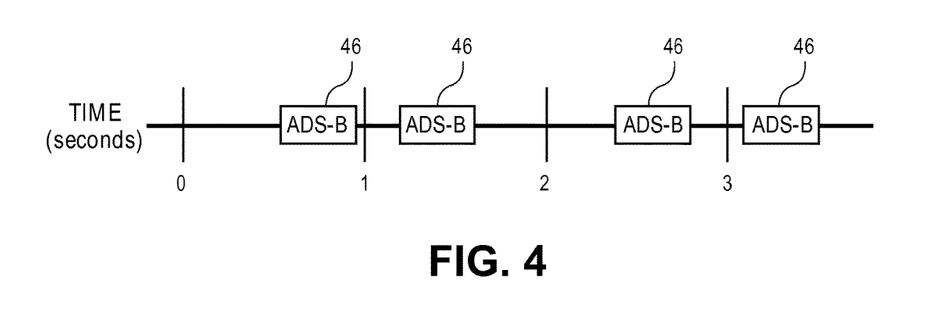
FIG. 4 is a timeline that depicts the timing of when an ADS-B data packet is generated.

The processing element 28 may further be operable, configured, or programmed to generate ADS-B Out data given the navigational, geolocation, and transponder data. The processing element 28 may form a packet 46, indicated in FIG. 4, that includes the navigational, geolocation, and transponder data in an ADS-B Out format. The processing element 28 may communicate the packet to the transmitter 18. The processing element 28 may further instruct the transmitter 18 when it is time to transmit the packet 46. UAT protocols may specify the frequency at which the packet 46 is to be transmitted, such as once per second, although other frequencies or timescales are possible. UAT protocols may also specify the exact time during that period may be random. Thus, the processing element 28 may include or be in communication with a random number generator. FIG. 4 illustrates this concept, in which a box, labeled "ADS-B" and representing one packet 46, is shown in multiple places on a timeline indicating the packet 46 being transmitted once per second but at a different, or varying, time during each second. For example, the first packet 46 may be transmitted at approximately 0.6 seconds (s), the second packet 46 may be transmitted at approximately 1.25 s, the third packet 46 may be transmitted at approximately 2.4 s, the fourth packet 46 may be transmitted at approximately 3.1 s, and so forth. The processing element 28 may instruct the transmitter 18 to transmit the packet 46 on this random interval schedule. Furthermore, the processing element 28 may receive transponder data from the receiver 20, more or less, as the receiver 20 receives the data from the transponder 106. Thus, the processing element 28 may be aware of when the transponder 106 is transmitting its data. Accordingly, the processing element 28 may not instruct the transmitter 18 to transmit the packet 46 while the transponder 106 is transmitting. Instead, the processing element 28 may instruct the transmitter 18 to only transmit the packet 46 while the transponder 106 is silent.

The processing element 28 may additionally be operable, configured, or programmed to assert, or generate, a switch signal and communicate the signal to the first control terminal 42 of the switch 22. The switch signal may be a voltage level or a current level that is sufficient to energize the coil of the switch 22. The processing element 28 may communicate the switch signal just before instructing the transmitter 18 to transmit the packet 46. Typically, each packet 46 is of a uniform length or data size. Thus, the processing element 28 may assert the switch signal for a given period of time while the packet 46 is being transmitted. Alternatively, the transmitter 18 may feedback a signal to the processing element 28 to indicate the end of transmission. When the packet 46 has been transmitted, the processing element 28 may deassert, or stop generating, the switch signal.

The ADS-B avionics device 10 may be installed in an aircraft 100 that already has the transponder 106 and the antenna 108. An additional communications cable, such as a coax cable, may be required. The original cable between the transponder 106 and the antenna 108 may be disconnected from the antenna 108 and connected to the first port 12 of the ADS-B avionics device 10. The new cable may be connected from the second port 14 of the ADS-B avionics device 10 to the antenna 108.

Once the cable connections are made, the ADS-B avionics device 10 may operate as follows. The receiver 20 may start monitoring the data output of the transponder 106. The transponder 106 may receive one or more interrogations while the SSR 104 antenna is pointing at the aircraft 100 during its 360-degree rotation. The transponder 106 may respond to the interrogation with its identification and altitude data. Then, the transponder 106 may be silent while it waits for the next interrogation as the SSR 104 antenna continues its rotation. In some environments, other devises such as TAS or TCAS may also interrogate the transponder 106. The receiver 20 may receive the data from the transponder 106.

At the same time and on a continuous basis, the location determining element 16 may be generating geolocation data. Given the transponder data from the receiver 20 and the geolocation data from the location determining element 16, the processing element 28 may form a first packet 46 of ADS-B Out data and communicate it to the transmitter 18. When the transponder 106 is not transmitting and at a random time within a first one-second timeframe, the processing element 28 may assert the switch signal, which puts the switch 22 in the second mode, and then may instruct the transmitter 18 to transmit the first packet 46. With this mode of the switch 22, the output of the transmitter 18 may be electrically coupled, through the switch 22 and the second port 14, to the antenna 108, which broadcasts the ADS-B Out data of the first packet 46. In addition, with the second mode of the switch 22, the transponder 106 may be electrically coupled, through first port 12 and the switch 22, to the load 24. This configuration may act equivalently as a suppression bus for the transponder 106. A transponder suppression bus inhibits the ability of the transponder 106 to send data outside the aircraft 100 (typically via the antenna 108), that may interfere with other transmissions. In this case, suppressing the transponder 106 ensures an uninterrupted transmission of UAT data which may be included in the transmitted packet 46.

After a period of time, or after the transmitter 18 indicates the end of transmission, the processing element 28 may deassert the switch signal, putting the switch 22 back into the first mode. The processing element 28 may receive updated geolocation data while the transmitter 18 is transmitting. The processing element 28 may form a second packet 46 of ADS-B Out data with updated geolocation data and communicate it to the transmitter 18. If the transponder 106 is silent during a second one-second timeframe, the processing element 28, at a random time, may assert the switch signal and then may instruct the transmitter 18 to transmit the second packet 46. After a period of time, or after the transmitter 18 indicates the end of transmission, the processing element 28 may deassert the switch signal. If the transponder 106 is still silent during another one-second timeframe, the processing element 28 may repeat the process of forming another packet 46, communicating it the transmitter 18, asserting the switch signal, instructing the transmitter 18 to transmit the packet 46, and deasserting the switch signal. This process may continue until the transponder 106 receives another interrogation and responds with transponder data. The processing element 28 may wait until the transponder 106 transmission is over before it forms another packet 46 with updated transponder and geolocation data. The processing element 28 may then repeat the packet 46 transmission procedure described above. Transmission of the packet 46 in this fashion may also be referred to as "squitting" or "squittering".

The ADS-B avionics device 10 of the current technology may easily be integrated with an aircraft's existing transponder 106 and antenna 108 to provide ADS-B Out data transmissions. The ADS-B avionics device 10 does not interfere with the operation of the transponder 106 or require an additional antenna 108 to provide ADS-B Out functionality.

Figure 5:
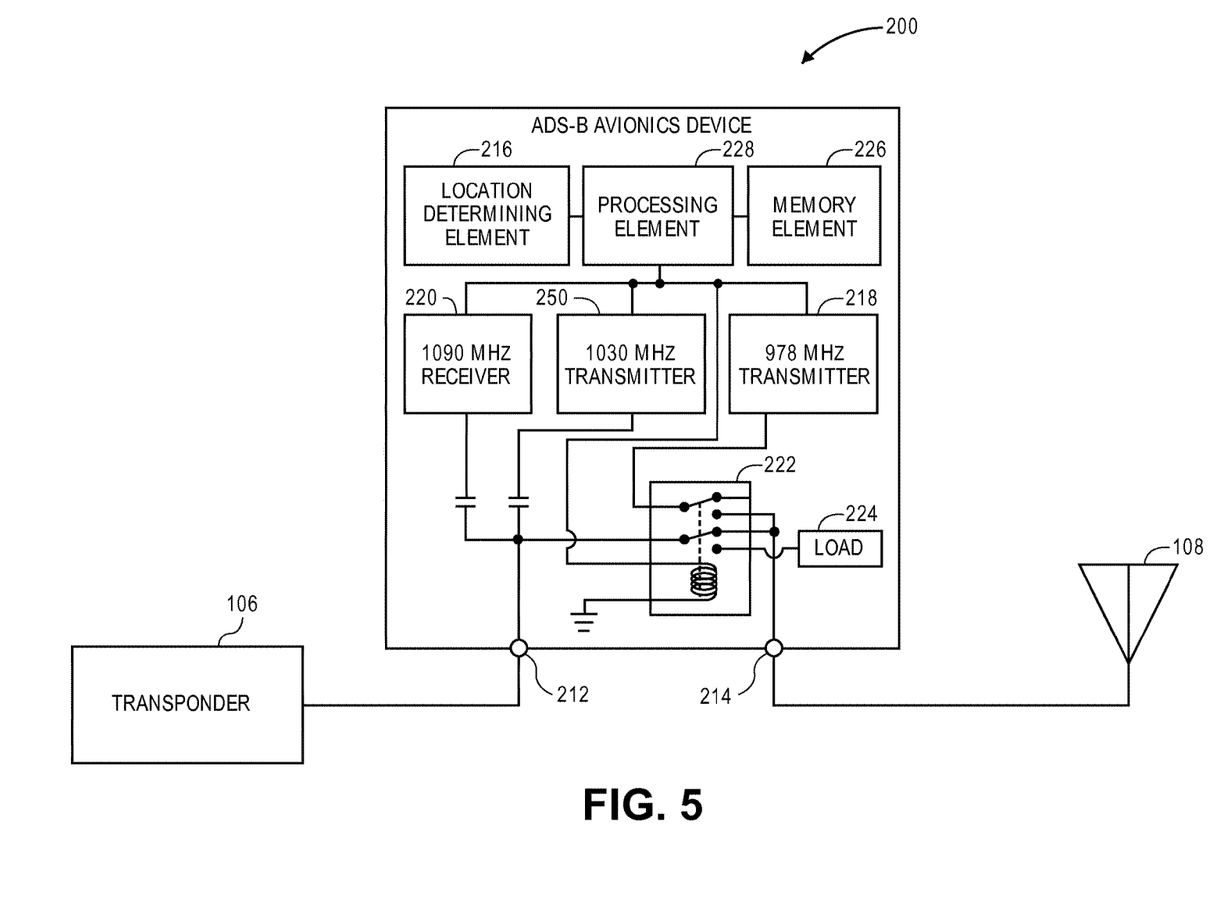
FIG. 5 is a schematic block diagram of another embodiment of the ADS-B avionics device installed in an aircraft and interfacing with the transponder and the antenna.

A second embodiment of an ADS-B avionics device 200 is shown in FIG. 5. The ADS-B avionics device 200 maintains all of the functionality of the ADS-B avionics device 10, but adds the ability to selectively interrogate the transponder 106 in order to provide updated transponder data in the ADS-B Out data packet 46. The ADS-B avionics device 200 may broadly comprise a first port 212, a second port 214, a location determining element 216, a first transmitter 218, a receiver 220, a switch 222, a load 224, a memory element 226, and a processing element 228, all of which may be substantially identical to the like-named components for the ADS-B avionics device 10. The first transmitter 218 may be substantially identical to the transmitter 18. The ADS-B avionics device 200 may further include a second transmitter 250.

The second transmitter 250 generally transmits an interrogation to the transponder 106. Therefore, the second transmitter 250 may include electronic circuitry that can transmit an electronic signal at 1030 MHz. The electronic circuitry may include amplifiers, filters, encoders, mixers, oscillators, DSPs, and the like. The second transmitter 250 may include an input from the processing element 28 that receives the interrogation data to be communicated to the transponder 106. In some embodiments, the second transmitter 250 may include a memory component that stores the interrogation data. The second transmitter 250 may also receive control signals from the processing element 228 that instruct the second transmitter 250 to transmit the interrogation. The second transmitter 250 may further include an output that is RF-coupled to the first port 212, which is electrically coupled to the transponder 106 when the ADS-B avionics device 200 is installed in an aircraft 100.

The processing element 228 may include all of the functionality of the processing element 28 and may also be operable, configured, or programmed to instruct the second transmitter 250 to transmit a transponder interrogation that is communicated to the first port 212. So that the interrogation is not also communicated to the second port 214 and the antenna 108, the processing element 228 may first assert the switch signal, which puts the switch 222 in the second mode, and then may instruct the second transmitter 250 to transmit the interrogation. The switch signal may be asserted while the second transmitter 250 transmits the interrogation and the transponder 106 transmits the transponder data in response. In some embodiments, the processing element 228 may assert the switch signal for a predetermined period of time. In other embodiments, the receiver 220 may communicate an end of transponder data signal to the processing element 228. After a predetermined period of time or an end of data signal, the processing element 228 may deassert the switch signal, and the receiver 220 may communicate the transponder data to the processing element 228. The processing element 228 may interrogate the transponder 106 (by asserting the switch signal and instructing the second transmitter 250 to transmit the interrogation data) at a predetermined frequency. An exemplary frequency may be once every 2 seconds. However, the specific time within the two-second timeframe may be random, in a similar fashion to the transmission of the ADS-B Out data packet 46 discussed above. Generally, though, the processing element 228 interrogates the transponder 106 only when the transponder is not responding to an SSR 104 interrogation and when the first transmitter 218 is not transmitting the packet 46.

The ADS-B avionics device 200 may operate as follows. The ADS-B avionics device 200 may be installed in an aircraft 100 in the same fashion as the ADS-B avionics device 10. The ADS-B avionics device 200 may function in substantially the same fashion as the ADS-B avionics device 10 except that when the first transmitter 218 is not transmitting the ADS-B Out data packet 46 and when the transponder 106 is not responding to an SSR 104 interrogation, the processing element 228 may interrogate the transponder 106. Specifically, at a random time within a two-second timeframe, the processing element 228 may assert the switch signal putting the switch 222 in the second mode, which disconnects the first port 212 and the transponder 106 from the second port 214 and the antenna 108—thereby allowing communication with the transponder 106 that will not be transmitted to the antenna 108 and broadcast outside the aircraft 100. This configuration may act equivalently as a suppression bus for the transponder 106. A transponder suppression bus inhibits the ability of the transponder 106 to send data outside the aircraft 100 (typically via the antenna 108), that may interfere with other transmissions. In this mode, only the ADS-B avionics device 200 can detect the transponder data since the transponder 106 is transmitting through the switch 222 into the load 224.

The processing element 228 may instruct the second transmitter 250 to transmit the interrogation data through the first port 212 to the transponder 106. The transponder 106 may respond by transmitting its transponder data through the first port 212 to the receiver 220. After a period of time or an end of data signal, the processing element 228 may deassert the switch signal, putting the switch 222 back in the first mode and reconnecting the first port 212 and the transponder 106 to the second port 214 and the antenna 108. The receiver 220 may then communicate the transponder data to the processing element 228, which may form a packet 46 with updated transponder data. The processing element 228 may continue to perform the interrogation process, as described above as long as the transponder 106 is not responding to an SSR 104 interrogation and the first transmitter 218 is not transmitting a packet 46.

Figure 6:
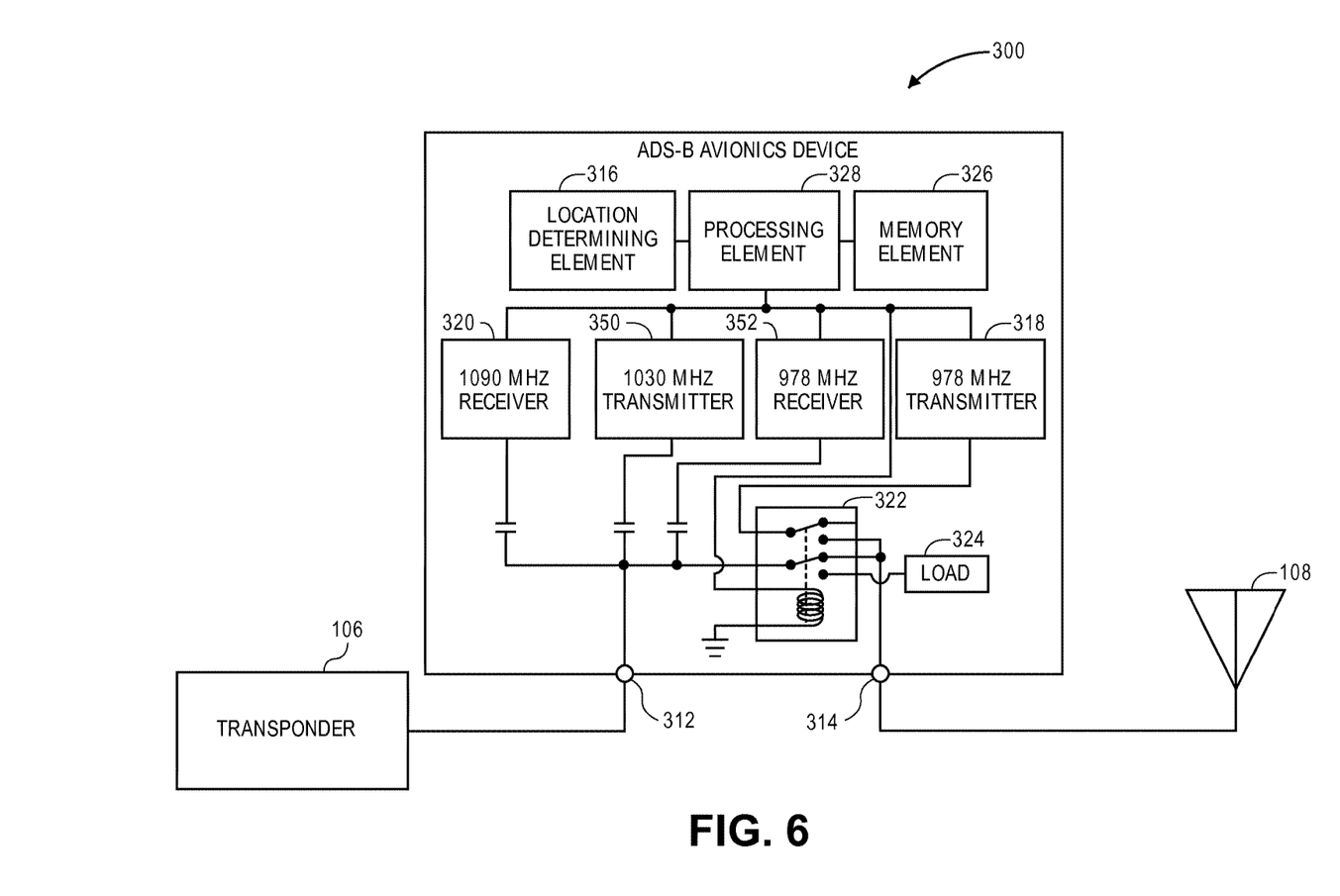
FIG. 6 is a schematic block diagram of yet another embodiment of the ADS-B avionics device installed in an aircraft and interfacing with the transponder and the antenna.

A third embodiment of an ADS-B avionics device 300 is shown in FIG. 6. The ADS-B avionics device 300 maintains all of the functionality of the ADS-B avionics device 200 or the ADS-B avionics device 10, but adds the ability to receive ADS-B In data. ADS-B In is another part of the ADS-B standard which specifies protocols for the aircraft 100 to receive environmental data, such as weather and air traffic data, from ground sources 102 as well as navigational data from other aircraft 100 in flight or on the ground. The weather data may include ambient readings such as temperature, humidity, air pressure, wind speed and direction, as well as weather radar data which can be viewed on cockpit-located multi function displays. The air traffic data may include information about surrounding aircraft 100 including their altitudes, headings, velocities, and distances from the current aircraft 100. The ADS-B avionics device 300 may broadly comprise a first port 312, a second port 314, a location determining element 316, a first transmitter 318, a first receiver 320, a switch 322, a load 324, a memory element 326, a processing element 328, and a second transmitter 350, all of which may be substantially identical to the like-named components for the ADS-B avionics device 200. The first receiver 320 may be substantially identical to the receiver 220. The ADS-B avionics device 300 may further include a second receiver 352. In various embodiments not shown in the figures, the ADS-B avionics device 300 may additionally include a wired or wireless communication port that allows communication with one or more cockpit-located multi function displays.

The second receiver 352 generally receives ADS-B In data for general aviation aircraft 100 using UAT protocols. Therefore, the second receiver 352 may include electronic circuitry that can receive an electronic signal at 978 MHz. The electronic circuitry may include amplifiers, filters, decoders, mixers, oscillators, DSPs, and the like. The second receiver 352 may include an input that is RF coupled to the first terminal of the switch 322, such that when the switch 322 is in the first mode, the input of the second receiver 352 is RF-coupled to the second port 314 in order to receive data from the antenna 108. In some embodiments, the second receiver 352 may receive control signals from the processing element 328. The second receiver 352 may further include an output. In some embodiments, the output may be electrically coupled to the processing element 328 such that ADS-B In data is communicated to the processing element 328 which in turn forwards the ADS-B In data to the communication port to be shared with cockpit-located components. In other embodiments, the output may be electrically coupled to the communication port which shares the ADS-B In data with cockpit-located components.

The ADS-B avionics device 300 may operate as follows. The ADS-B avionics device 300 may be installed in an aircraft 100 in the same fashion as the ADS-B avionics devices 10, 200. The ADS-B avionics device 300 may function in substantially the same fashion as the ADS-B avionics device 200, except that when the switch 322 is in the first mode (implying that the first transmitter 318 is not transmitting the ADS-B Out data packet 46 and the processing element 328 is not interrogating the transponder 106) the second receiver 352 may receive ADS-B In data when the transponder 106 is not responding to an SSR 104 interrogation. The ADS-B In data may be communicated either directly, or indirectly through the processing element 328, to the communication port which shares the ADS-B In data with cockpit-located components.

Figure 7:
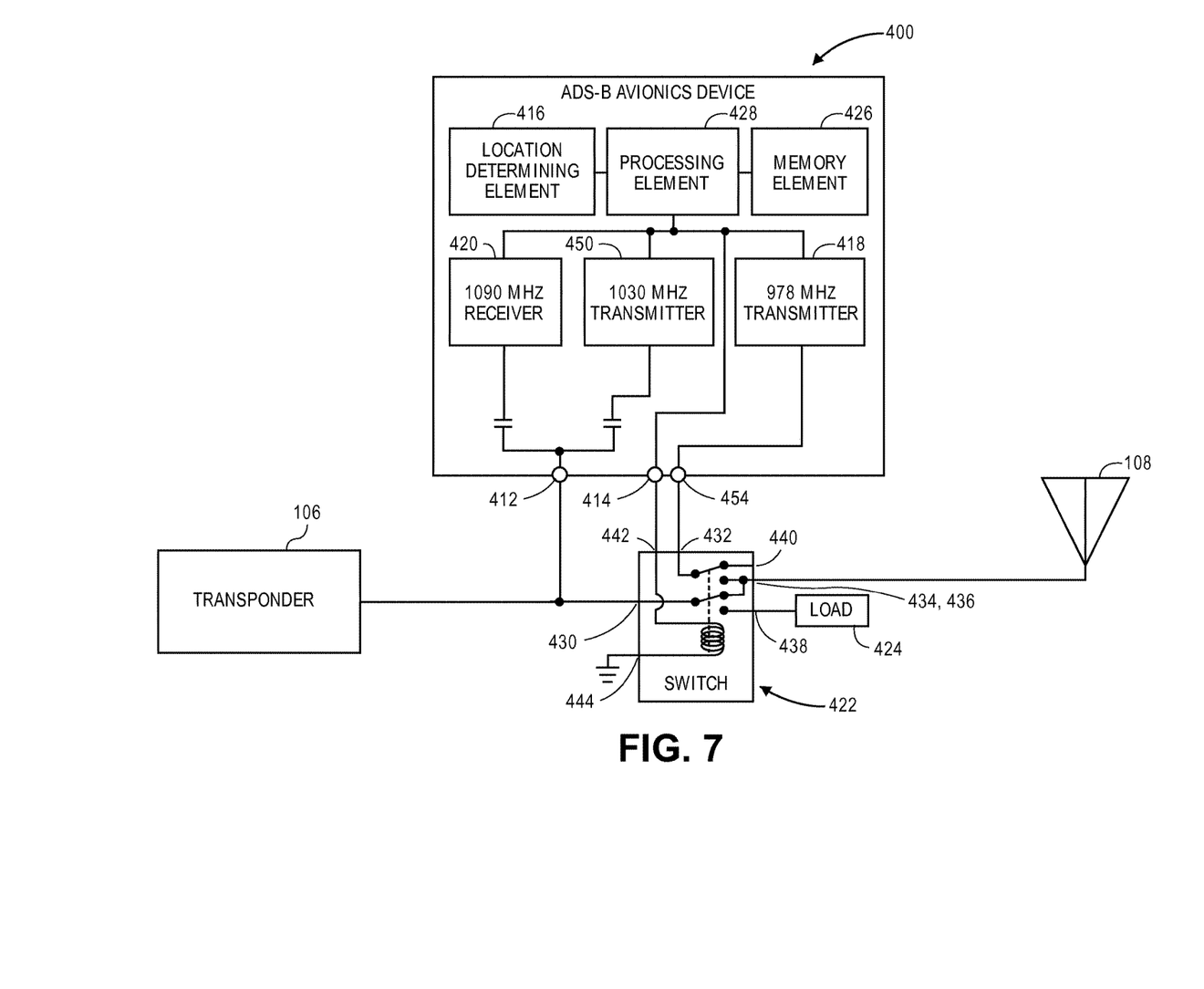
FIG. 7 is a schematic block diagram of yet another embodiment of the ADS-B avionics device installed in an aircraft and interfacing with the transponder and the antenna.

A fourth embodiment of an ADS-B avionics device 400 is shown in FIG. 7. The ADS-B avionics device 400 may be similar to the device 200 and may broadly comprise, at the least, a first port 412, a second port 414, a location determining element 416, a first transmitter 418, a receiver 420, a switch 422, a load 424, a memory element 426, a processing element 428, and a second transmitter 450, all of which may be similar to the like-named components discussed above. In addition, the switch 422 may comprise a first terminal 430, a second terminal 432, a third terminal 434, a fourth terminal 436, a fifth terminal 438, a sixth terminal 440, a first control terminal 442, and a second control terminal 444. However, with the ADS-B avionics device 400, the switch 422 and the load 424 may be implemented outside of a housing that encloses the other components. As a result, the first port 412 may be RF coupled (through a capacitor) to the input of the receiver 420 and the output of the second transmitter 450. The second port 414 may be electrically coupled to the processing element 428 and may receive and communicate the switch signal. In addition, the ADS-B avionics device 400 may include a third port 454, which is electrically coupled to the output of the first transmitter 418.

The housing of the ADS-B avionics device 400 may be mounted in the aircraft 100 with the transponder 106 and the antenna 108. The switch 422 and the load 424 may be installed in close proximity to the housing of the ADS-B avionics device 400. The transponder 106 may be electrically coupled to the first terminal 430 of the switch 422 through a first cable, while the third and fourth terminals 434, 436 may be electrically coupled to the antenna 108. The first port 412 may also be electrically coupled to the first terminal 430. The second port 414 may be electrically coupled to the first control terminal 442. The third port 454 may be electrically coupled to the second terminal 432. The fifth terminal 438 may be electrically coupled to the load 424, while the second control terminal 444 may be electrically coupled to electrical ground. The ADS-B avionics device 400 may function in substantially the same fashion as the ADS-B avionics device 200 with the ability to both monitor and actively interrogate the transponder 106 and the ability to transmit ADS-B Out data.

In an alternative embodiment, the ADS-B avionics device 400 may exclude the switch 422 and the load 424. Those may be external components with which the ADS-B avionics device 400 interacts. In such an embodiment, the operation of the combination of the ADS-B avionics device 400, the switch 422, and the load 424 may be substantially the same as the ADS-B avionics device 400 discussed above.

Figure 8:
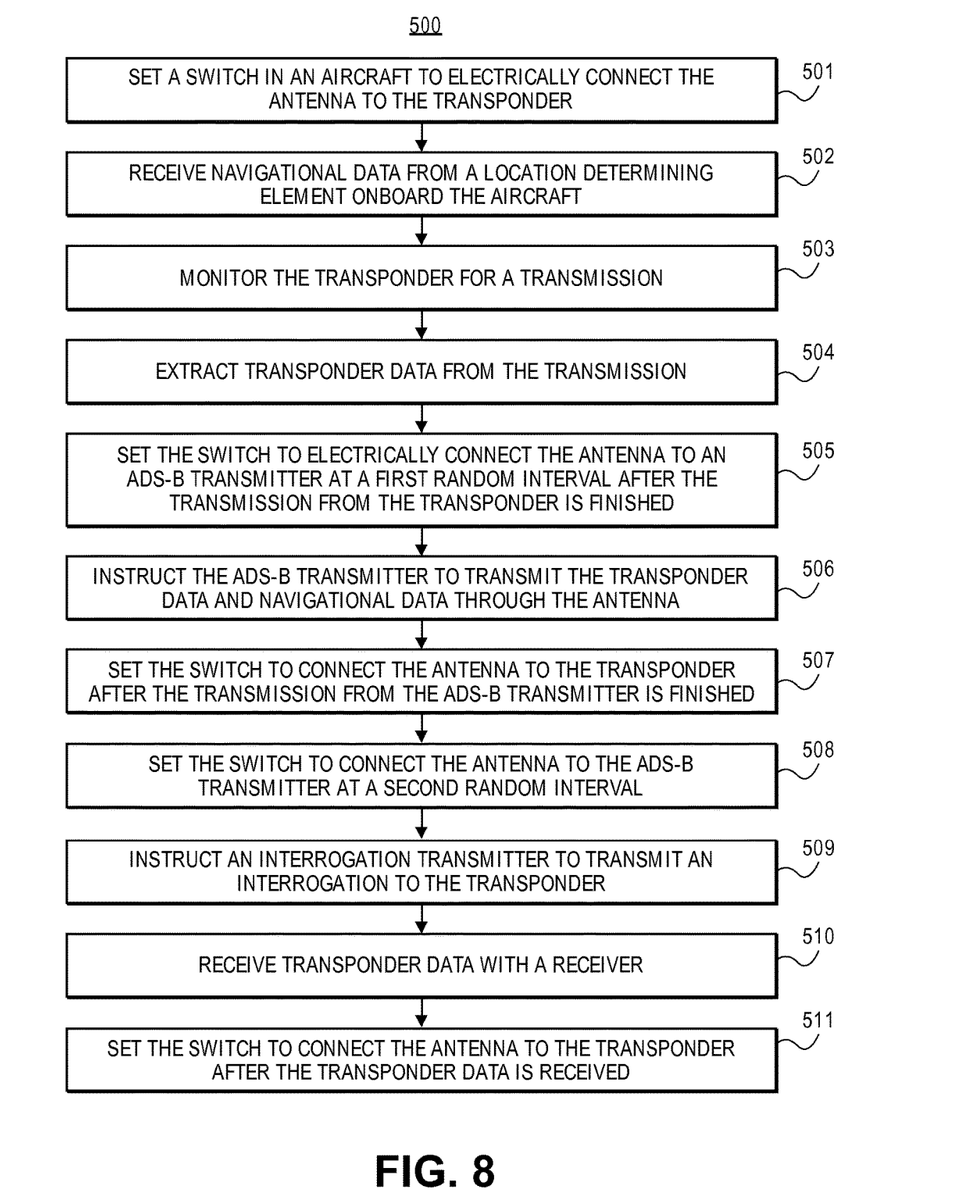
FIG. 8 is a flow diagram of at least a portion of the steps of a method of operating an ADS-B avionics device.

FIG. 8 depicts a listing of at least a portion of the steps of an exemplary method 500 for operating an Automatic Dependent Surveillance-Broadcast (ADS-B) avionics device to be implemented in an aircraft with a transponder 106 and an antenna 108. The ADS-B avionics device may be embodied by the ADS-B avionics devices 10, 200, 300, although an exemplary ADS-B avionics device may be embodied by the ADS-B avionics device 400. The steps of the method 500 may be performed in the order shown in FIG. 8, or they may be performed in a different order. Furthermore, some steps may be performed concurrently as opposed to sequentially. In addition, some steps may be optional.

Referring to step 501, a switch 422 in an aircraft 100 is set to electrically connect the antenna 108 to the transponder 106. The switch 422 may include at least three terminals, with a first terminal 430 electrically coupled to the transponder 106, RF-coupled to the output of a second transmitter 450, and RF-coupled to the input of a receiver 420, a second terminal 432 electrically coupled to the output of a first transmitter 418, and a third terminal 434/436 electrically coupled to the antenna 108. The first transmitter 418, the second transmitter 450, and the receiver 420 may be components of the ADS-B avionics device 400. The switch 422 may operate in at least two modes: a default first mode in which the first terminal 430 is electrically coupled to the third terminal 434 and a second mode in which the second terminal 432 is electrically coupled to the third terminal 434. An exemplary switch 422 may be embodied by a DPDT switch that includes an actuator, which, when energized, changes the switch 422 from the first mode to the second mode. The actuator may be energized by a switch signal from a processing element 428 of the ADS-B avionics device 400. When the actuator is unenergized, the switch 422 remains in the first mode. Step 501 may be a passive step, as the switch 422 is set to the first mode, which establishes electrical connection between the antenna 108 and the transponder 106, by default.

Referring to step 502, navigational data is received from a location determining element 416 onboard the aircraft 100. In some embodiments, the location determining element 416 may be a component of the ADS-B avionics device 400, while in other embodiments, the location determining element 416 may be an external component from which the ADS-B avionics device 400 receives data. The location determining element 416 may provide geolocation data from which navigational data can be derived, navigational data, or a combination of both.

Referring to steps 503 and 504, the transponder 106 is monitored for a transmission. In accordance with standard operating procedure, the transponder 106 transmits transponder data when it relies to an interrogation from the SSR 104. The receiver 420 may receive the transmission from the transponder 106, may extract transponder data, and communicate the data to the processing element 428.

Referring to step 505, the switch 422 is set to connect the antenna 108 to the first transmitter 418 at a first random interval after the transmission from the transponder 106 has finished. In step 505, the mode of the switch 422 is changed from the first mode to the second mode by the processing element 428 asserting the switch signal. Based on UAT protocols, the processing element 428 may determine the first random time interval within a fixed timeframe to assert the switch signal. For example, at a first random time within a one-second timeframe the processing element 428 may assert the switch signal.

Referring to step 506, the first transmitter 418 is instructed to transmit the transponder data and the navigational data through the antenna 108. The first transmitter 418 may be operable to transmit an ADS-B Out data packet 46 that includes the transponder and navigational data. The first transmitter 418 may transmit the packet 46 at a frequency of approximately 978 MHz.

Referring to step 507, the switch 422 is set to connect the antenna 108 to the transponder 106 after the transmission from the first transmitter 418 has finished. In step 507, the mode of the switch 422 is changed back to the first mode from the second mode by the processing element 428 deasserting the switch signal. The processing element 428 may wait for a fixed period of time for the packet 46 to be transmitted, or the processing element 428 may receive an end of transmission signal from the first transmitter 418, before deasserting the switch signal.

Referring to step 508, the switch 422 is set to connect the antenna 108 to the first transmitter 418 at a second random interval after the transmission from the transponder 106 has finished. The switch 422 is changed from the first mode to the second mode in preparation for an interrogation of the transponder 106 by the ADS-B avionics device 400. Thus, the processing element 428 may wait until the transponder 106 is not responding to an SSR 104 interrogation and the first transmitter is not transmitting an ADS-B Out data packet 46. Accordingly, the processing element 428 may determine the second random time interval within a fixed timeframe to assert the switch signal. For example, at a second random time within a two-second timeframe the processing element 428 may assert the switch signal.

Referring to step 509, the second transmitter 450 is instructed to transmit an interrogation to the transponder 106. The second transmitter 450 may transmit the interrogation with a known protocol and at the frequency (approximately 1030 MHz) of the SSR 104 interrogation. The second transmitter 450 may be instructed by the processing element 428 to transmit the interrogation.

Referring to step 510, the transponder data is received by the receiver 420. The data is extracted and communicated to the processing element 428.

Referring to step 511, the switch 422 is set to connect the antenna 108 to the transponder 106 after the transponder data is received. The mode of the switch 422 is changed by the processing element 428 deasserting the switch signal.

One or more of the steps above may be repeated indefinitely as the ADS-B avionics device 400 continues to monitor the transponder 106 for transmissions, transmits ADS-B Out data when the transponder 106 is not transmitting, and interrogates the transponder 106 when the transponder 106 is not transmitting and ADS-B Out data is not being transmitted.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. An Automatic Dependent Surveillance-Broadcast (ADS-B) avionics device for use in an aircraft with a transponder and an antenna, the ADS-B avionics device comprising:
   a housing;
   a first port operable to electrically couple with the transponder, the transponder located onboard the aircraft;
   a second port operable to electrically couple with the antenna, the antenna mounted on an exterior surface of the aircraft;
   a first transmitter operable to generate data to be transmitted on the antenna;
   a switch including
      a first terminal electrically coupled to the first port,
      a second terminal electrically coupled to the first transmitter, and
      a third terminal electrically coupled to the second port,
      wherein the switch is configured to be selectively changed between a first mode in which the first terminal is electrically coupled to the third terminal and a second mode in which the second terminal is electrically coupled to the third terminal; and
   a processing element in electronic communication with the first transmitter and a memory element, the processing element programmed to—
      control the switch to change from the first mode to the second mode at a first random time interval,
      instruct the first transmitter to transmit an ADS-B Out data packet to the second port,
      maintain the switch in the second mode for a first period of time during which the ADS-B Out data packet is transmitted, and
      control the switch to change from the second mode to the first mode after the first period of time has elapsed;
   wherein the first transmitter, the switch and the processing element are enclosed within the housing.

2. The ADS-B avionics device of claim 1, wherein a value of the first random time interval is determined by universal access transceiver (UAT) protocol.

3. The ADS-B avionics device of claim 1, wherein the first transmitter is operable to transmit the ADS-B Out data packet at a frequency of approximately 978 megahertz.

4. The ADS-B avionics device of claim 1, further comprising a receiver operable to receive transponder data through the first port from the transponder and the processing element is further programmed to maintain the switch in the first mode while the transponder is transmitting the transponder data in response to an interrogation from an external source.

5. The ADS-B avionics device of claim 1, wherein the transceiver element includes
  a second transmitter operable to transmit an interrogation through the first port to be received by the transponder and
  a receiver operable to receive transponder data reply through the first port from the transponder,
  wherein the processing element is further programmed to—
    control the switch to change from the first mode to the second mode at a second random time interval,
    instruct the second transmitter to transmit the interrogation to the first port,
    maintain the switch in the second mode for a second period of time during which the interrogation is transmitted and transponder data is received, and
    control the switch to change from the second mode to the first mode after the second period of time has elapsed.

6. The ADS-B avionics device of claim 5, further comprising a location determining element electrically coupled with a second antenna, wherein the location determining element is operable to provide geolocation and navigational data and the processing element creates the ADS-B Out data packet to include geolocation and navigational data and transponder data.

7. The ADS-B avionics device of claim 5, wherein the second transmitter is operable to transmit the interrogation at a frequency of 1030 megahertz.

8. The ADS-B avionics device of claim 5, wherein the receiver is operable to receive the transponder data at a frequency of 1090 megahertz.

9. The ADS-B avionics device of claim 1, further comprising a termination load electrically coupled to the first port when the switch is in the second mode such that the termination load is operable to be electrically coupled to the transponder when the switch is in the second mode.

10. An Automatic Dependent Surveillance-Broadcast (ADS-B) avionics device for use in an aircraft with a transponder and an antenna, the ADS-B avionics device comprising:
  a housing;
  a first port operable to electrically couple with the transponder, the transponder located onboard the aircraft;
  a second port operable to electrically couple with the antenna, the antenna mounted on an exterior surface of the aircraft;
  a receiver operable to receive transponder data generated by the transponder;
  a first transmitter operable to generate an ADS-B Out data packet to be transmitted on the antenna;
  a second transmitter operable to generate an interrogation to be received by the transponder;
  a switch including
    a first terminal electrically coupled to the first port,
    a second terminal electrically coupled to the first transmitter, and
    a third terminal electrically coupled to the second port,
    wherein the switch is configured to be selectively changed between a first mode in which the first terminal is electrically coupled to the third terminal and a second mode in which the second terminal is electrically coupled to the third terminal; and
  a processing element in electronic communication with the receiver, the first transmitter, the second transmitter, and a memory element, the processing element programmed to—
    set the switch to the first mode,
    monitor the transponder for transmissions,
    maintain the switch in the first mode while the transponder is transmitting transponder data,
    control the switch to change from the first mode to the second mode at a first random time interval after the transponder has finished transmitting transponder data,
    instruct the first transmitter to generate the ADS-B Out data packet,
    maintain the switch in the second mode for a first period of time during which the first transmitter generates the ADS-B Out data packet, and
    control the switch to change from the second mode to the first mode after the first period of time has elapsed;
  wherein the receiver, the first transmitter, the second transmitter, the switch and the processing element are enclosed within the housing.

11. The ADS-B avionics device of claim 10, wherein the processing element is further programmed to—
  control the switch to change from the first mode to the second mode at a second random time interval,
  instruct the second transmitter to transmit the interrogation to the first port,
  maintain the switch in the second mode for a second period of time during which the interrogation is transmitted and transponder data is received, and
  control the switch to change from the second mode to the first mode after the second period of time has elapsed.

12. The ADS-B avionics device of claim 11, wherein the first transmitter is operable to transmit the ADS-B Out data packet at a frequency of approximately 978 megahertz.

13. The ADS-B avionics device of claim 11, wherein the second transmitter is operable to transmit the interrogation at a frequency of 1030 megahertz.

14. The ADS-B avionics device of claim 11, wherein the receiver is operable to receive the transponder data at a frequency of 1090 megahertz.

15. The ADS-B avionics device of claim 10, further comprising a termination load electrically coupled to the first port when the switch is in the second mode such that the termination load is operable to be electrically coupled to the transponder when the switch is in the second mode.

16. A method of operating an Automatic Dependent Surveillance-Broadcast (ADS-B) avionics device to be implemented in an aircraft with a transponder and an antenna, the method comprising the steps of:
  asserting an electronic signal at a first random time interval to be received by a switch that establishes an electrical connection between the antenna and an ADS-B transmitter, the antenna mounted on an exterior surface of the aircraft;
  instructing the ADS-B transmitter to generate an ADS-B Out data packet; and
  deasserting the electronic signal after the ADS-B Out data packet is generated;
  wherein the ADS-B transmitter and the switch are enclosed within a housing.

17. The method of claim 16, further comprising the steps of:
  monitoring the transponder for a transponder data transmission in response to an interrogation and
  asserting the electronic signal at the first random time interval after the transponder has finished transmitting transponder data, the transponder located onboard the aircraft.

18. The method of claim 16, further comprising the steps of
- asserting the electronic signal at a second random time interval,
- instructing an interrogation transmitter to transmit an interrogation to the transponder,
- receiving transponder data with a receiver, and
- deasserting the electronic signal after the transponder data is received.

19. The method of claim 17, further comprising the step of creating the ADS-B Out data packet to include transponder data.

20. The method of claim 17, further comprising the steps of
- receiving a global navigation satellite system signal,
- generating geolocation and navigational data from the global navigation satellite system signal, and
- creating the ADS-B Out data packet to include transponder data and geolocation and navigational data.

21. The ADS-B avionics device of claim 1, wherein the first port and the second port are on a wall of the housing.

22. The ADS-B avionics device of claim 10, wherein the first port and the second port are on a wall of the housing.

23. The ADS-B avionics device of claim 1, wherein the first port and the second part are each connectors that couple with a coaxial cable.

24. The ADS-B avionics device of claim 10, wherein the first port and the second part are each connectors that couple with a coaxial cable.

25. The ADS-B avionics device of claim 6, wherein the location determining element and the second antenna are enclosed within the housing.

26. The ADS-B avionics device of claim 1, further comprising a communication element in electronic communication with the processing element, wherein the communication element is configured to receive geolocation and navigational data from a location determining element, and wherein the processing element creates the ADS-B Out data packet to include transponder data and the received geolocation and navigational data.

* * * * *